United States Patent
Fischer et al.

(10) Patent No.: US 11,067,044 B2
(45) Date of Patent: Jul. 20, 2021

(54) FLUID CONVEYING DEVICE

(71) Applicant: CPT Group GmbH, Hannover (DE)

(72) Inventors: Matthias Fischer, Ringgau (DE);
Johannes Deichmann, Rotenburg (DE);
Andreas Schmick, Rotenburg (DE);
Karsten Gerst, Oberaula (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/333,754

(22) PCT Filed: Sep. 13, 2017

(86) PCT No.: PCT/EP2017/073024
§ 371 (c)(1),
(2) Date: Mar. 15, 2019

(87) PCT Pub. No.: WO2018/050696
PCT Pub. Date: Mar. 22, 2018

(65) Prior Publication Data
US 2019/0360440 A1    Nov. 28, 2019

(30) Foreign Application Priority Data
Sep. 16, 2016  (DE) ................... 10 2016 217 800.8

(51) Int. Cl.
*F02M 37/10*    (2006.01)
*F02M 37/02*    (2006.01)
(Continued)

(52) U.S. Cl.
CPC ........ *F02M 37/106* (2013.01); *F02M 37/025* (2013.01); *F02M 37/18* (2013.01);
(Continued)

(58) Field of Classification Search
CPC .... F02M 37/106; F02M 37/025; F02M 37/12; F02M 37/18; F02M 37/0052;
(Continued)

(56) References Cited

U.S. PATENT DOCUMENTS 6,341,623 B1 * 1/2002 Channing ............ B60K 15/077
123/514
6,607,005 B2 * 8/2003 Viebahn ............... B60K 15/077
123/510
(Continued)

FOREIGN PATENT DOCUMENTS

CN    105917102    8/2016
DE    198 47 722   7/1999
(Continued)

OTHER PUBLICATIONS

English Translation of FR-2680142, Goly, Translation obtained May 18, 2020 (Year: 1993).*
(Continued)

*Primary Examiner* — Dominick L Plakkoottam
(74) *Attorney, Agent, or Firm* — Cozen O'Connor

(57) ABSTRACT

A fluid-conveying device for conveying a fluid from a tank includes: a first fluid-conveying pump; a swirl pot; and a second fluid-conveying pump having a drive region and a conveying region coupled to the drive region. The fluid is conveyable from the swirl pot by the first fluid-conveying pump, and the conveying region is configured and arranged so as to be drivable by the drive region.

8 Claims, 1 Drawing Sheet

(51) Int. Cl.
    *F02M 37/18* (2006.01)
    *F04F 5/10* (2006.01)
    *B60K 15/077* (2006.01)
    *B60K 15/03* (2006.01)

(52) U.S. Cl.
    CPC .............. *F04F 5/10* (2013.01); *B60K 15/077* (2013.01); *B60K 2015/0325* (2013.01); *B60K 2015/03105* (2013.01); *B60K 2015/03111* (2013.01)

(58) Field of Classification Search
    CPC .............. F02M 37/0088; F02M 37/10; F02M 37/0094; F02M 59/00; B60K 15/077; B60K 2015/03105; B60K 2015/03111; B60K 2015/03118; B60K 2015/03138; B60K 2015/03144; B60K 2015/0325; B60K 2015/03243; F04F 5/10; F04C 11/003
    See application file for complete search history.

(56) References Cited

U.S. PATENT DOCUMENTS

| | | | |
|---|---|---|---|
| 6,988,491 B2* | 1/2006 | Burhenne | B60K 15/077 |
| | | | 123/509 |
| 7,278,404 B2* | 10/2007 | Wolters | F02M 37/025 |
| | | | 123/456 |
| 7,370,640 B2* | 5/2008 | Dickenscheid | B60K 15/077 |
| | | | 123/510 |
| 7,473,069 B2* | 1/2009 | Deichmann | F04D 5/005 |
| | | | 415/55.6 |
| 7,644,702 B2* | 1/2010 | Dickenscheid | F02M 37/025 |
| | | | 123/509 |
| 7,675,405 B2* | 3/2010 | Rumpf | G01F 1/6845 |
| | | | 340/450.2 |
| 7,874,811 B2* | 1/2011 | Kieninger | F02M 37/025 |
| | | | 123/509 |
| 8,485,790 B2* | 7/2013 | Rumpf | F02M 37/025 |
| | | | 123/497 |
| 9,140,225 B2* | 9/2015 | Lollini | B64D 37/00 |
| 2004/0052654 A1* | 3/2004 | Reinhardt | F02M 37/106 |
| | | | 417/313 |
| 2006/0112937 A1 | 6/2006 | Tittmann | |
| 2008/0095642 A1 | 4/2008 | Schelhas et al. | |
| 2009/0290994 A1* | 11/2009 | Kieninger | F04F 5/463 |
| | | | 417/198 |
| 2010/0012096 A1* | 1/2010 | Kieferle | F02M 37/0052 |
| | | | 123/497 |
| 2011/0135505 A1* | 6/2011 | Kieninger | F02M 37/12 |
| | | | 417/182.5 |

FOREIGN PATENT DOCUMENTS

| | | | | |
|---|---|---|---|---|
| DE | 10 2010 043 644 | | 5/2012 | |
| DE | 102012020396 A1 * | | 4/2014 | ............. B60K 15/03 |
| DE | 10 2013 016 823 | | 4/2015 | |
| DE | 11 2013 005 000 | | 7/2015 | |
| EP | 1861625 B1 * | | 10/2015 | ............. F04F 5/464 |
| FR | 2 680 142 | | 2/1993 | |
| FR | 2680142 A1 * | | 2/1993 | ......... F02M 37/0052 |
| GB | 2341207 | | 3/2000 | |
| JP | S 61-065067 | | 4/1986 | |
| JP | S62 183064 | | 11/1987 | |
| JP | H02-191861 | | 7/1990 | |
| JP | 2008-527235 | | 7/2008 | |
| KR | 2009-0065388 | | 6/2009 | |
| WO | WO 02/48535 | | 6/2002 | |
| WO | WO 2006/072503 | | 7/2006 | |

OTHER PUBLICATIONS

Office Action dated Feb. 26, 2020 issued in Korean Patent Application No. 10-2019-7009920.
International Search Report issued in corresponding PCT application No. PCT/EP2017/073024.
Written Opinion issued in corresponding PCT application No. PCT/EP2017/073024.
German Office Action dated Apr. 12, 2017 issued in corresponding German application No. 10 2016 217 800.8.
Notice to Submit Response dated Oct. 23, 2020 issued in Korean Patent Application No. 10-20197009920.
Office Action dated Mar. 29, 2021 issue in Korean Patent Application No. 10-2019-7009920.

* cited by examiner

FLUID CONVEYING DEVICE

CROSS REFERENCE TO RELATED APPLICATIONS

This is a U.S. national stage of application No. PCT/EP2017/073024, filed on Sep. 13, 2017 which claims priority to German Application No. 10 2016 217 800.8, filed Sep. 16, 2016, the content of each of which is incorporated herein by reference.

BACKGROUND OF THE INVENTION

1. Field of the Invention

The invention relates to a fluid-conveying device for conveying a fluid from a tank.

2. Description of the Prior Art

In motor vehicles, use is made of tank systems for storing different liquids. Tank systems are used, inter alia, for storing fuels, lubricants or reducing agents, for example for exhaust-gas aftertreatment. Owing to the given space conditions in motor vehicles, it is necessary in some cases to provide a very rugged tank or a tank that consists of multiple interconnected tank chambers. Reference is largely made below to an application in a fuel tank. However, applicability also extends to tanks for storing other liquid media, such as for example a lubricant or a reducing agent.

In order at all times to be able to ensure complete emptying of the tank and in order to ensure that at all times fuel is adequately provided at the conveying point for providing a supply to the internal combustion engine, it is necessary for the fuel to be conveyed from the regions remote from the conveying point toward the conveying point. The conveying point is in this case generally formed by a fuel-conveying pump that conducts the fuel toward the internal combustion engine.

In known fuel-conveying systems, the fuel-conveying pump is generally arranged in a swirl pot, which is filled by a suction jet pump such that a sufficient volume of fuel is constantly available in the swirl pot in order that the fuel-conveying pump can convey fuel and does not run dry. In the devices known in the prior art, the conveyance of the fuel from the remote regions of the fuel tank or other tank chambers is likewise realized via suction jet pumps. Such suction jet pumps, just like the suction jet pump for providing a supply to the swirl pot, are passively provided with a supply by the fuel-conveying pump by way of a bypass. As soon as the fuel-conveying pump conveys a fuel stream in the direction of the internal combustion engine, a partial volume of the fuel is, via a defined, generally non-variable bypass, branched off and conveyed through the suction jet pumps. As a result of the conveyance of the fuel through the suction jet pump, a propulsive jet is formed in the suction jet pump, which jet partially generates a negative pressure and thus entrains fuel from the surroundings of the suction jet pump and conveys this fuel to the conveying point.

A disadvantage of the devices in the prior art is in particular that the suction jet pumps are permanently operated concomitantly during operation of the fuel-conveying pump. Consequently, power of the fuel-conveying pump is permanently branched off and used for the provision of a supply to the suction jet pumps. The operation of the suction jet pumps is not regulated and adapted to the actual driving situation or the actual instantaneous fuel requirement. In order nevertheless to ensure adequate conveyance of fuel through the suction jet pumps at all times, it is necessary for the fuel-conveying pump to be correspondingly overdimensioned, so that, in addition to the power actually required for the conveyance of the fuel currently required, power is also adequately available for operating the suction jet pumps.

The larger-dimensioned fuel-conveying pump has, for its part, a higher current consumption, whereby overall, more energy has to be used to operate the fuel-conveying system, whereby in particular, the total fuel consumption of a motor vehicle is increased.

SUMMARY OF THE INVENTION

It is therefore an object of the present invention to provide a fluid-conveying device that allows more energy-efficient operation of the required suction jet pumps. It is also an object of the present invention to allow requirement-dependent operation of the suction jet pumps. It is also the object of the invention to provide a motor vehicle having a fluid-conveying device according to the invention.

The object relating to the fluid-conveying device may be achieved, according to one aspect of the invention, by a fluid-conveying device for conveying a fluid from a tank, having a first fluid-conveying pump, having a swirl pot and having a second fluid-conveying pump, wherein the fluid is able to be conveyed from the swirl pot by the first fluid-conveying pump, wherein the second fluid-conveying pump has a drive region and has a conveying region, wherein the conveying region is coupled to the drive region and is able to be driven by way of the drive region.

A fluid-conveying pump may be, for example, an electrically operated pump which is activated via a controller in a requirement-dependent manner. Such a fluid-conveying pump has an electric motor and a pump stage, which is coupled to the electric motor and which conveys a fluid to be conveyed. It is alternatively also possible for a fluid-conveying pump to be formed by two pump stages mechanically coupled to one another. In this regard, for example, one of the pump stages can be driven by a fluid stream, and a fluid can be conveyed through the second pump stage, which is coupled to the first pump stage. Such a fluid-conveying pump thus requires a fluid stream as a driver.

The coupling of an electric fluid-conveying pump and a fluid-conveying pump, which functions for example mechanically, as described above, may be advantageously used in order, for example, to convey a fluid from a tank toward a reservoir or swirl pot, and to convey the fluid further from the reservoir to a consumer. If the second fluid-conveying pump is in this case driven by a fluid stream conveyed by the first fluid-conveying pump, operation of the second fluid-conveying pump, which operation depends on the activation of the first fluid-conveying pump, is realized in a simple manner.

Preferably, an above-described second fluid-conveying pump has a drive region and a conveying region, which are coupled to one another for transmitting the rotational movement. In a particularly preferred exemplary embodiment, the second fluid-conveying pump can function according to the principle of a turbocharger, in which a fluid stream is used for driving.

It is particularly advantageous if the conveying region and the drive region are mechanically coupled to one another by way of a common shaft. The mechanical coupling is particularly advantageous since it is thereby possible for a particularly simple, robust, durable and low-cost fluid-conveying pump to be produced. The coupling of the drive region to the conveying region can be produced by a simple through drive without an additional transmission. In an alternative configuration, it is also possible for a transmission to be provided. In a further advantageous configuration, it is also possible for the transmission of the rotational movement from the drive region to the conveying region to be switchable in order, for example by opening a coupling, for example a friction coupling, to reduce the conveying power of the second fluid-conveying pump to a lower value or completely to zero.

It is also advantageous if the drive region is able to be driven by a volume stream conveyed by the first fluid-conveying pump. The driving of the second fluid-conveying pump by a volume stream or fluid stream, which is conveyed by the first fluid-conveying pump, is advantageous since, in this way, the operation of the second fluid-conveying pump depends directly on the fluid stream conveyed by the first fluid-conveying pump. The conveying power of the second fluid-conveying pump thus always forms a determinable ratio with the conveying power of the first fluid-conveying pump.

It is particularly advantageous if the fluid stream driving the second fluid-conveying pump is formed by the fluid stream conveyed to the consumer by the first fluid-conveying pump. In one application in a motor vehicle, the drive region of the second fluid-conveying pump may, for example, be advantageously incorporated in the so-called feed for providing a supply to the internal combustion engine. It is thereby ensured that the second fluid-conveying pump is activated in a requirement-dependent manner in dependence on the actual fuel requirement of the internal combustion engine. In motor vehicles with an internal combustion engine, the main fuel-conveying pump, which corresponds to the first fuel-conveying pump of the embodiment according to an aspect of the invention, is activated by a controller such that, at all times, the exactly required quantity of fuel is conveyed to the internal combustion engine. This ensures, inter alia, that the use of large amounts of electrical power for conveying an excessively large volume of fuel does not occur unnecessarily. A coupling of the conveying power of the second fluid-conveying pump to the conveying power of the first fluid-conveying pump is advantageous since, in this way, it is ensured that at all times suitable replenishment of fuel from the tank into the swirl pot takes place. According to the fuel conveyed from the swirl pot to the internal combustion engine, a filling of the swirl pot can be produced by the second fluid-conveying pump.

A preferred exemplary embodiment is characterized in that the second fluid-conveying pump is arranged downstream of the first fluid-conveying pump in a flow direction toward a consumer to be provided with a supply. The arrangement of the drive region of the second fluid-conveying pump downstream of the first fluid-conveying pump is advantageous for producing a direct dependence of the conveying power of the second fluid-conveying pump on the conveying power of the first fluid-conveying pump. The second fluid-conveying pump can be driven by the entire fluid stream conveyed by the first fluid-conveying pump or only by a partial volume of the fluid stream. Furthermore, it is possible, for example, to provide a connectable bypass duct for the driving of the second fluid-conveying pump. In this way, the second fluid-conveying pump can also be deactivated independently of the first fluid-conveying pump in that, for example, the bypass duct is not opened up for throughflow.

It is also to be preferred if the drive region and/or the conveying region have/has a pump stage. Pump stages, such as for example turbine wheels or blade wheels, are advantageous for transmitting, via a shaft to a blade wheel used as a drive, the energy of the volume stream conveyed by the first fluid-conveying pump and thereby for generating a pump power in the second fluid-conveying pump.

In addition to conventional turbine wheels and blade wheels, it is also possible to provide further pump stages which are usable for conveying fluids. In this regard, it is also possible, for example, for the second fluid-conveying pump to generate fluid conveyance through the use of the displacement principle. The selection of a pump principle is virtually unlimited as long as a coupling of the drive region and the conveying region of the second fluid-conveying pump is achieved and, in this way, a dependence between the fluid stream driving the second fluid-conveying pump and the fluid stream conveyed through the second fluid-conveying pump.

It is also advantageous if the conveying region of the second fluid-conveying pump is fluidically coupled to a suction jet pump, wherein the suction jet pump is able to be operated by the volume stream conveyed through the second fluid-conveying pump. It is advantageously possible by way of the second fluid-conveying pump for an additional suction jet pump to also be operated, in order for example to supply a fluid stream to further units. This is advantageous in particular if a fluid is to be conveyed away from multiple regions, spaced apart from one another, in a tank.

It is also advantageous if the fluid is able to be conveyed from the tank into the swirl pot through the second fluid-conveying pump. This is particularly advantageous since continuous filling of the swirl pot is thereby achieved. Since the first fluid-conveying pump generally conveys fluid away from the swirl pot, the swirl pot would be emptied without new fluid being supplied. Since the operation of the second fluid-conveying pump directly depends on the operation of the first fluid-conveying pump, the complete emptying of the swirl pot can be avoided.

It is also expedient for the first fluid-conveying pump to be arranged in the swirl pot. This is advantageous in order, at all times, to ensure a constant supply of fluid to the first fluid-conveying pump and to avoid the running-dry of the first fluid-conveying pump. Here, the swirl pot forms in particular a reservoir out of which the first fluid-conveying pump conveys the fluid. Thus, even in the case of a possible inclined position of the tank, it is ensured that the intake region of the first fluid-conveying pump dips into the fluid situated in the swirl pot at all times.

An object relating to a motor vehicle having a fluid-conveying device according to an as aspect of invention may be achieved by a motor vehicle having a fluid-conveying device wherein the fluid situated in the swirl pot is able to be conveyed toward an internal combustion engine through the first fluid-conveying pump, wherein the second fluid-conveying pump is arranged downstream of the first fluid-conveying pump in a conveying direction toward the internal combustion engine and the swirl pot is able to be filled by way of the operation of the second fluid-conveying pump. The application in the fuel supply system of a motor vehicle, in particular, is advantageous. The coupling of the second fluid-conveying pump to the first fluid-conveying pump ensures that, according to the fuel requirement of the internal combustion engine, constant replenishment of the fuel from the tank or individual tank chambers into the swirl pot is realized. Here, it is particularly advantageous that the conveying power of the second fluid-conveying pump is automatically varied with a variation in the conveying power of the first fluid-conveying pump. If the internal combustion engine consumes, for example, less fuel, the conveying power of the first fluid-conveying pump is reduced. Consequently, a smaller fluid stream is conveyed by the first fluid-conveying pump, whereby the conveying power of the second fluid-conveying pump is also reduced.

It is furthermore advantageous if the second fluid-conveying pump is in fluid contact with one or more regions of the fuel tank via a first fluid line and is in fluid contact with the inner volume of the swirl pot via a second fluid line, wherein fuel is able to be conveyed from the tank into the swirl pot by operation of the second fluid-conveying pump.

Through the provision of one or more fluid lines, which project into the tank from the intake region of the second fluid-conveying pump, it is possible to ensure that all the regions of the tank can be emptied by the second fluid-conveying pump. In an advantageous configuration, it may be provided for example that different fluid lines, from which the second fluid-conveying pump can be fed, are connected or disconnected in order, for example, to prevent air being drawn in. It is also possible for multiple second fluid-conveying pumps to be provided in order for fuel to be conveyed from different regions.

Advantageous refinements of the present invention are described in the following description.

BRIEF DESCRIPTION OF THE DRAWINGS

The invention will be discussed in detail below on the basis of exemplary embodiments with reference to the drawings, in which.

DETAILED DESCRIPTION OF THE PRESENTLY PREFERRED EMBODIMENTS

Figure 1:
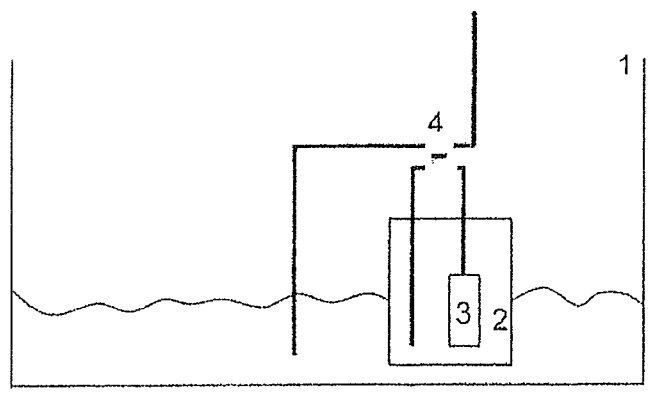
FIG. 1 shows a schematic sectional view of a tank with a swirl pot situated therein, with a first fluid-conveying pump and with a second fluid-conveying pump.

FIG. 1 shows a schematic sectional view through a tank 1. A swirl pot 2 is arranged within the tank 1. The swirl pot 2 serves for storing a volume of fuel, from which the first fluid-conveying pump 3, which is arranged within the swirl pot 2, draws in fuel. As in conventional fuel supply systems, this prevents the intake opening of the first fluid-conveying pump 3 from drawing in air. This can otherwise occur, for example, during uphill travel or cornering with acceleration if the fuel is forced away from the intake opening of the first fluid-conveying pump 3.

The first fluid-conveying pump 3 conveys fuel from the swirl pot 2 toward an internal combustion engine (not shown). In this case, the first fluid-conveying pump 3 is activated by a controller (likewise not shown) such that the internal combustion engine is supplied with fuel according to the actual fuel requirement.

Arranged in the feed line, which runs from the first fluid-conveying pump 3 toward the internal combustion engine, is a second fluid-conveying pump 4, which serves for conveying fuel from the tank 1 into the swirl pot 2. Here, the second fluid-conveying pump 4 is driven by the fluid stream that the first fluid-conveying pump 3 conveys to the internal combustion engine. For this purpose, either the entire fluid stream or only a partial volume of the fuel conveyed by the first fluid-conveying pump 3 is conducted through the second fluid-conveying pump 4.

By way of an arrangement as per FIG. 1, it is achieved that, if the tank 1 is filled with fuel, the swirl pot 2 is at all times filled by the second fluid-conveying pump 4. Furthermore, by way of the coupling of the second fluid-conveying pump 4 to the first fluid-conveying pump 3, it is achieved that in each case a requirement-dependent replenishment of the fuel occurs.

Figure 2:
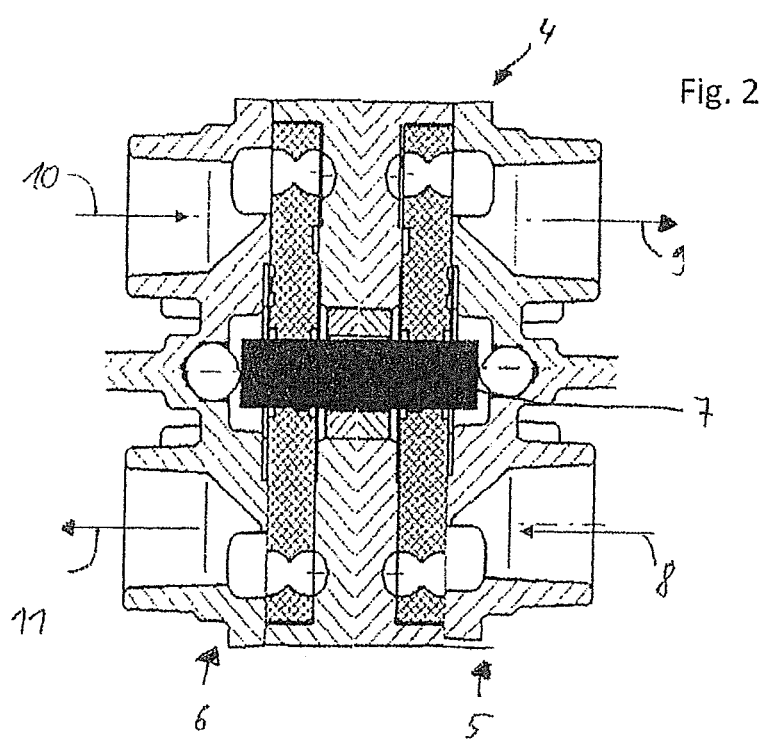
FIG. 2 shows a sectional view through an exemplary second fluid-conveying pump, with a drive region and a conveying region being provided, which are mechanically coupled to one another in order to transmit the movement of the drive region to the conveying region 6.

FIG. 2 shows a sectional drawing through the second fluid-conveying pump 4. The second fluid-conveying pump 4 substantially has a drive region 5 and a conveying region 6. The two regions 5 and 6 are mechanically coupled to one another via a shaft 7. The drive region 5 consists substantially of a pump wheel, which functions as a pump stage and can be driven by the volume stream conveyed by the first fluid-conveying pump. The conveying region 6 likewise has a pump wheel, which functions as a pump stage and is driven via the shaft 7. Consequently, it is possible for conveyance of fluid to take place in the conveying region 6.

Along the arrow 8, the volume stream which is conveyed by the first fluid-conveying pump 3 flows into the second fluid-conveying pump 4 and drives the pump stage of the drive region 5. Along the arrow 9, said volume stream finally flows out of the drive region 5 and toward the internal combustion engine.

The pump stage of the conveying region 6 is driven by way of the rotational movement, transmitted via the shaft 7, of the pump stage of the drive region 5, as a result of which fuel is drawn into the conveying region 6 of the second fluid-conveying pump 4 along the arrow 10 and is pumped toward the swirl pot along the arrow 11.

The exemplary embodiment of FIG. 2 shows, by way of example, a possible configuration for a second fluid-conveying pump 4 according to the invention. In the example shown, the coupling is realized mechanically via the shaft 7. In alternative configurations, it is also possible for different pump concepts to be provided. In this regard, gear motor pumps or turbines may be provided for example.

The exemplary embodiments of FIGS. 1 and 2 are in particular not of a limiting nature, and serve for illustrating the concept of the invention. It is also the case that concepts which differ therefrom may lie within the defined scope of protection and make use of the concept of the invention.

Although the preceding description has described exemplary embodiments, it is to be noted that a multiplicity of variations are possible. Moreover, it is to be noted that the exemplary embodiments are merely examples which are not intended to restrict the scope protection, the applications and the construction in any way. Rather, a person skilled in the art is given a guideline for the implementation of at least one exemplary embodiment by the preceding description, it being possible for various modifications to be performed, in particular with regard to the function and arrangement of the described constituent parts, without departing from the scope of protection as arises from the claims and the equivalent combinations of features.

The invention claimed is:

1. A fluid-conveying device for conveying a fluid from a tank, comprising:
   a first fluid-conveying pump (3);
   a swirl pot (2) arranged within the tank; and
   a second fluid-conveying pump (4) having a drive region (5) and a conveying region (6) coupled to the drive region (5), wherein the fluid is conveyable from the swirl pot (2) by the first fluid-conveying pump (3), and wherein the conveying region (6) is configured and arranged so as to be drivable by the drive region (5), and wherein the second fluid-conveying pump (4) is arranged downstream of the first fluid-conveying pump (3) in a flow direction toward a consumer, such that a volume stream of the fluid conveyed from the swirl pot (2) by the first fluid-conveying pump (3) first enters the second fluid-conveying pump (4), then exits the second fluid-conveying pump (4), and then, further downstream of the second fluid-conveying pump (4), enters the consumer.

2. The fluid-conveying device as claimed in claim 1, wherein the conveying region (6) and the drive region (5) are mechanically coupled to one another by a shaft (7).

3. The fluid-conveying device as claimed in claim 1, wherein the drive region (5) is configured and arranged so as to be drivable by the volume stream conveyed by the first fluid-conveying pump (3).

4. The fluid-conveying device as claimed in claim 1, wherein the drive region (5) and/or the conveying region (6) have/has a pump stage.

5. The fluid-conveying device as claimed in claim 1, wherein the fluid is conveyed from the tank (1) into the swirl pot (2) through the conveying region (6) of the second fluid-conveying pump (4).

6. The fluid-conveying device as claimed in claim 1, wherein the first fluid-conveying pump (3) is arranged in the swirl pot (2).

7. A motor vehicle having a fluid-conveying device as claimed in claim 1, wherein the consumer is an internal combustion engine, and wherein fluid in the swirl pot (2) is conveyed toward the internal combustion engine through the first fluid-conveying pump (3), wherein the second fluid-conveying pump (4) is arranged downstream of the first fluid-conveying pump (3) in a conveying direction toward the internal combustion engine, and upstream of the internal combustion engine, and the swirl pot (2) is configured and arranged so as to be fillable by operation of the second fluid-conveying pump (4), via the conveying region (6) of the second fluid-conveying pump (4).

8. The motor vehicle as claimed in claim 7, wherein the second fluid-conveying pump (4) is in fluid contact with one or more regions of the tank (1) via a first fluid line and is in fluid contact with an inner volume of the swirl pot (2) via a second fluid line, wherein fuel is conveyed from the tank into the swirl pot (2) by operation of the second fluid-conveying pump (4).

* * * * *